US010512941B2

(12) United States Patent
Moriyama et al.

(10) Patent No.: US 10,512,941 B2
(45) Date of Patent: Dec. 24, 2019

(54) PROJECTION INSTRUCTION DEVICE, PARCEL SORTING SYSTEM, AND PROJECTION INSTRUCTION METHOD

(71) Applicant: PANASONIC INTELLECTUAL PROPERTY MANAGEMENT CO., LTD., Osaka (JP)

(72) Inventors: Takaaki Moriyama, Kanagawa (JP);
Shohji Ohtsubo, Kanagawa (JP);
Akihiro Suzuki, Kanagawa (JP);
Takaaki Idera, Kanagawa (JP);
Takeshi Ishihara, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/086,933

(22) PCT Filed: Feb. 21, 2017

(86) PCT No.: PCT/JP2017/006271
§ 371 (c)(1),
(2) Date: Sep. 20, 2018

(87) PCT Pub. No.: WO2017/163714
PCT Pub. Date: Sep. 28, 2017

(65) Prior Publication Data
US 2019/0084009 A1 Mar. 21, 2019

(30) Foreign Application Priority Data

Mar. 23, 2016 (JP) .................................. 2016-059271

(51) Int. Cl.
*G06K 7/10* (2006.01)
*B07C 3/18* (2006.01)
(Continued)

(52) U.S. Cl.
CPC ................. *B07C 3/18* (2013.01); *B07C 3/08* (2013.01); *G03B 21/14* (2013.01)

(58) Field of Classification Search
CPC ... G06K 1/10722; G06K 7/14; G06K 7/10851
(Continued)

(56) References Cited

U.S. PATENT DOCUMENTS 7,090,134 B2 * 8/2006 Ramsager ................. B07C 3/18
235/462.13
7,561,717 B2 * 7/2009 Anderson .......... G06K 17/0022
382/101

(Continued)

FOREIGN PATENT DOCUMENTS

JP 2007-523811 8/2007
JP 2013-245029 12/2013
(Continued)

OTHER PUBLICATIONS

International Search Report issued in International Patent Application No. PCT/JP2017/006271, dated May 23, 2017.
(Continued)

*Primary Examiner* — Ahshik Kim
(74) *Attorney, Agent, or Firm* — Greenblum & Bernstein, P.L.C.

(57) ABSTRACT

There is provided a projection instruction device which generates a projection image to be projected on a parcel based on an image including the parcel and parcel identification information specifying the parcel in the image, the device including: a processor; and a memory, in which by cooperating with the memory, the processor determines a specific area in which the parcel is picked up based on the parcel identification information, and in a case where the parcel is present in the specific area, the processor projects the projection image.

15 Claims, 7 Drawing Sheets

FIG. 3B

(51) Int. Cl.
 G03B 21/14 (2006.01)
 B07C 3/08 (2006.01)

(58) Field of Classification Search
 USPC .......................................... 235/454, 462.42
 See application file for complete search history.

(56) References Cited

U.S. PATENT DOCUMENTS

| | | | | |
|---|---|---|---|---|
| 8,110,052 | B2* | 2/2012 | Olsen | B07C 7/005 |
| | | | | 156/366 |
| 8,825,200 | B2* | 9/2014 | Carpenter | B07C 7/005 |
| | | | | 700/223 |
| 2004/0195320 | A1 | 10/2004 | Ramsager | |
| 2009/0114575 | A1 | 5/2009 | Carpenter et al. | |
| 2009/0145967 | A1* | 6/2009 | Carpenter | B07C 3/00 |
| | | | | 235/385 |
| 2017/0066597 | A1 | 3/2017 | Hiroi | |

FOREIGN PATENT DOCUMENTS

| | | |
|---|---|---|
| WO | 2005/073830 | 8/2005 |
| WO | 2015/145982 A1 | 10/2015 |

OTHER PUBLICATIONS

U.S. Appl. No. 16/086,649 to Akihiro Suzuki et al., filed Sep. 20, 2018.
U.S. Appl. No. 16/086,783 to Akihiro Suzuki et al., filed Sep. 20, 2018.
U.S. Appl. No. 16/086,840 to Shohji Ohtsubo et al., filed Sep. 20, 2018.
U.S. Appl. No. 16/086,707 to Takaaki Moriyama et al., filed Sep. 20, 2018.
U.S. Appl. No. 16/086,895 to Takaaki Moriyama et al., filed Sep. 20, 2018.
The Extended European Search Report dated Apr. 4, 2019 for the related European Patent Application No. 17769760.4.

* cited by examiner

PROJECTION INSTRUCTION DEVICE, PARCEL SORTING SYSTEM, AND PROJECTION INSTRUCTION METHOD

TECHNICAL FIELD

The present disclosure is related to an instruction projecting device, a parcel sorting system, and an instruction projecting method useful to sort a parcel.

BACKGROUND ART

As recent economic activity rises, the amount of parcel circulation tends to increase. In a circulation process of parcels, sorting work for sorting the parcels by destination is a time-consuming process and relies on manual work from before, but a technology of automating at least a part of the sorting work is proposed.

PTL 1 discloses a system in which a moving parcel is tracked, an image to be displayed is determined based on information related to the parcel read from the parcel and information of a position of the parcel, and the image is projected from a projector to display the image on the parcel.

CITATION LIST

Patent Literature

PTL 1: U.S. Pat. No. 7,090,134

SUMMARY OF THE INVENTION

However, in recent years, the amount of parcel circulation has been increased more and more and types of parcel have also become various, so that a technology of effectively and precisely sorting the parcel is required.

The present disclosure is related to the technology of effectively and precisely sorting the parcel.

According to the present disclosure, there is provided a projection instruction device which generates a projection image to be projected on a parcel based on sensing information of the parcel, the device including: a processor; and a memory, in which by cooperating with the memory, the processor calculates a position at which the projection image is projected based on first time information corresponding to a time of sensing the parcel.

According to the present disclosure, there is provided a projection instruction method of generating a projection image to be projected on a parcel based on sensing information of the parcel, the method including: by causing a processor to cooperate with a memory, calculating a position at which the projection image is projected based on first time information corresponding to a time of sensing the parcel.

According to the present disclosure, there is provided an instruction projecting device which generates a projection image to be projected on a parcel based on sensing information of the parcel, the device including: a processor; and a memory, in which by cooperating with the memory, the processor determines whether or not the parcel is picked up based on the sensing information, and in a case where it is determined that the parcel is picked up, the processor generates the projection image including detail information of the parcel.

According to the present disclosure, there is provided an instruction projecting method of generating a projection image to be projected on a parcel based on sensing information of the parcel, the method including: by causing a processor to cooperate with a memory, determining whether or not the parcel is picked up based on the sensing information; and in a case where it is determined that the parcel is picked up, generating the projection image including detail information of the parcel.

According to the present disclosure, there is provided a projection indicator which specifies a position of a parcel based on an image including the parcel, the indicator including: a processor; and a memory, in which by cooperating with the memory, the processor determines whether or not each of pixels in the image is a pixel included in a processing target space in which the parcel is to be present based on coordinates of each of the pixels, regards only the pixel included in the processing target space as a processing point to be processed and registers the processing point in the memory, and obtains the image of the parcel based on the registered processing point to specify the position of the parcel.

According to the present disclosure, there is provided a projection instruction method of generating a position of a parcel based on an image including the parcel, the method including: by cooperating with a memory, a processor determines whether or not each of pixels in the image is a pixel included in a processing target space in which the parcel is to be present based on coordinates of each of the pixels, regards only the pixel included in the processing target space as a processing point to be processed and registers the processing point in the memory, and obtains the image of the parcel based on the registered processing point to specify the position of the parcel.

According to the present disclosure, there is provided a projection instruction device which generates a projection image to be projected on a parcel based on sensing information of an image including the parcel, the device including: a processor; and a memory, in which by cooperating with the memory, the processor extracts a specific surface including the parcel from the sensing information of the parcel, and performs a process of generating the projection image based on only the specific surface.

According to the present disclosure, there is provided a projection instruction method of generating a projection image to be projected on a parcel based on sensing information of an image including the parcel, the method including: by causing a processor to cooperate with a memory, extracting a specific surface including the parcel from the sensing information of the parcel; and performing a process of generating the projection image based on only the specific surface.

According to the present disclosure, there is provided an instruction projecting device which generates a projection image to be projected on a parcel based on sensing information of the parcel and parcel identification information specifying the parcel in an image, the device including: a processor; and a memory, in which by cooperating with the memory, the processor determines a direction to pick up the parcel based on the parcel identification information, and generates the projection image indicating the direction to pick up the parcel.

According to the present disclosure, there is provided an instruction projecting method of generating a projection image to be projected on a parcel based on sensing information of the parcel and parcel identification information specifying the parcel in an image, the method including: by causing a processor to cooperate with a memory, determining a direction to pick up the parcel based on the parcel identification information; and generating the projection image indicating the direction to pick up the parcel.

According to the present disclosure, there is provided a projection instruction device which generates a projection image to be projected on a parcel based on an image including the parcel and parcel identification information specifying the parcel in the image, the device including: a processor; and a memory, in which by cooperating with the memory, the processor determines a specific area in which the parcel is picked up based on the parcel identification information, and in a case where the parcel is present in the specific area, the processor projects the projection image.

According to the present disclosure, there is provided a projection instruction method of generating a projection image to be projected on a parcel based on an image including the parcel and parcel identification information specifying the parcel in the image, the method including: by causing a processor to cooperate with a memory, determining a specific area in which the parcel is picked up based on the parcel identification information; and in a case where the parcel is present in the specific area, projecting the projection image.

In addition, according to the present disclosure, there is provided a parcel sorting system including: the projection instruction device described above; a label reader which reads parcel identification information from a label attached to a parcel; an image sensor which obtains an image; and an image output device which projects a projection image on the parcel.

According to the present disclosure, it is possible to more effectively and precisely sort the parcel and to further deal with an increase in the amount of parcel circulation.

DESCRIPTION OF EMBODIMENTS

Hereinafter, embodiments (hereinafter, referred to as "present embodiment") which specifically disclose an instruction projecting device, a parcel sorting system, and an instruction projecting method according to the present disclosure will be described in detail with reference to appropriate drawings. However, in some cases, unnecessarily detailed explanation may be omitted. For example, in some cases, detailed explanation of already well-known items and repetition explanation of substantially the same configuration may be omitted. This is to avoid unnecessary repetition of the following description and to facilitate understanding by those skilled in the art. The accompanying drawings and the following description are provided to enable those skilled in the art to fully understand the present disclosure and are not intended to limit a scope of the claims.

Hereinafter, the embodiments of the disclosure will be described with reference to FIGS. 1 to 8.

[Configuration]

Figure 1:
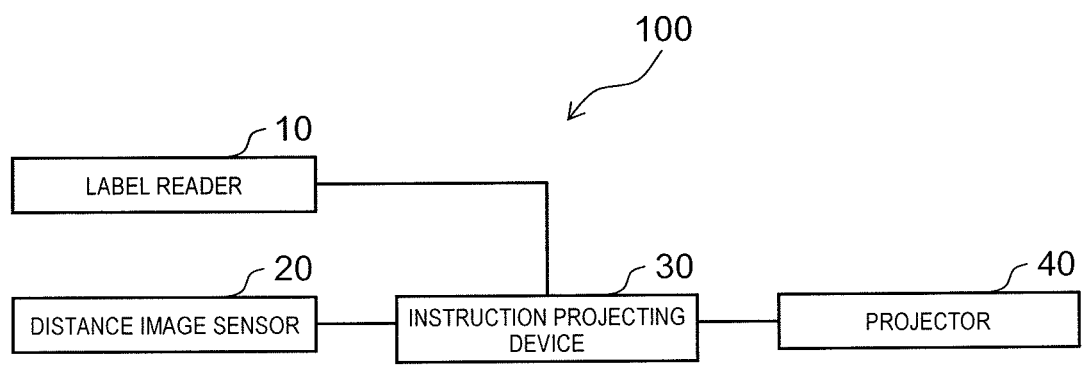
FIG. 1 is a block diagram illustrating a configuration of a parcel sorting system according to an embodiment.

FIG. 1 is a block diagram illustrating a configuration of the parcel sorting system according to the embodiment. Parcel sorting system 100 illustrated in FIG. 1 is installed in, for example, a distribution center. Parcel sorting system 100 includes label reader 10, distance image sensor 20, instruction projecting device 30, and projector 40. Parcel sorting system 100 is a system which supports work of a worker who sorts a parcel transported by a transport conveyor. Parcel sorting system 100 is installed at the distribution center owned by, for example, a retailer, a wholesaler, an internet distributor, or the like. A parcel to be sorted generally has an approximately rectangular parallelepiped shape, but the outward shape of the parcel is not particularly limited, and a type of the parcel is also not particularly limited. The configuration of the parcel sorting system is not limited to the configuration illustrated in FIG. 1. For example, one label reader 10 may be connected with a plurality of distance image sensors 20, a plurality of instruction projecting devices 30, and a plurality of projectors 40. The number of each of components can be appropriately modified according to the purpose.

Label reader 10 as a reading device is a device which includes various components such as a lens (not illustrated), an image sensor, and the like. By using label reader 10, it is possible to read label recording information including various types of information related to the parcel from a label attached to the parcel transported by the transport conveyor. By using the read label recording information, it becomes possible to specify the parcel. By the read information, parcel identification information is defined.

Distance image sensor 20 is an imaging device which includes various components such as a lens (not illustrated), an image sensor, and the like. Distance image sensor 20 is generally configured by an imaging camera. The imaging camera is a three-dimensional camera, a plurality of two-dimensional cameras, or the like. Distance image sensor 20 images the parcel transported by the transport conveyor and generates a distance image to obtain information such as a position of the parcel, a distance to the parcel, a size of the parcel, and the like. "Distance image" means an image including distance information indicating a distance from an imaging position to a position (including surface of parcel) indicated by each of pixels (that is, "image" in present disclosure includes distance image). In the present disclosure, distance image sensor 20 is used for specifying the position of the parcel. Therefore, distance image sensor 20 also can be replaced with another sensing device (ultrasonic sensor, infrared sensor, stereo camera, and monocular video camera). In the present disclosure, information output by a sensing device including these distance image sensors is referred to as sensing information. In the present embodiment, an example of the sensing device will be described by using distance image sensor 20. In addition, in the present embodiment, an example of the sensing information will be described by using the distance image output by distance image sensor 20.

Figure 2:
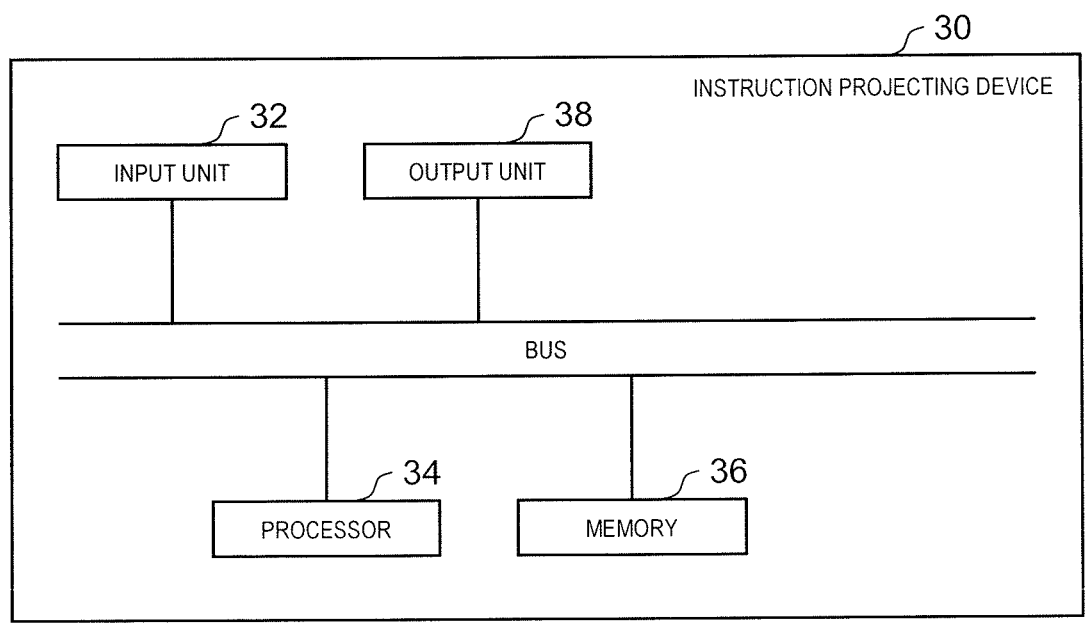
FIG. 2 is a block diagram illustrating a configuration of an instruction projecting device according to the embodiment.

Instruction projecting device 30 functions as a calculation device in parcel sorting system 100. As illustrated in FIG. 2, instruction projecting device 30 includes input unit 32, processor 34, memory 36, and output unit 38 connected with one another via a bus. Input unit 32 receives the parcel identification information for specifying the parcel obtained from the label recording information read by label reader 10 and the distance image generated by distance image sensor 20. Processor 34 is configured by a general calculation device and generates the projection image to be projected on the parcel based on the parcel identification information and the distance image. Memory 36 as a storage device reads a control program necessary for various processes by processor 34 and performs an operation such as data backup. That is, processor 34 and memory 36 control various processes by instruction projecting device 30 by cooperating with each other. Output unit 38 outputs the projection image generated by processor 34 to projector 40. In the present disclosure, "processor" does not mean only a single processor. "Processor" means an operator in a case where a plurality of identical purpose processors or processors of different purpose (for example, general-purpose central processing unit (CPU) and a graphic processing unit (GPU)) perform processes in collaboration with one another.

Projector 40 is configured by a general projection device, and projects projection light including the projection image received from instruction projecting device 30, on the parcel and displays the projection image onto the parcel.

Parcel sorting system 100 can be configured to include label reader 10, distance image sensor 20, instruction projecting device 30, and projector 40 connected with one another in wired communication or in wireless communication. In addition, parcel sorting system 100 also can be configured to include two or more devices of any of label reader 10, distance image sensor 20, instruction projecting device 30, and projector 40 as an integral device. For example, distance image sensor 20 and projector 40 can be combined to construct an integral imaging projection device (see FIG. 3A).

[Outline of System]

Figure 3A:
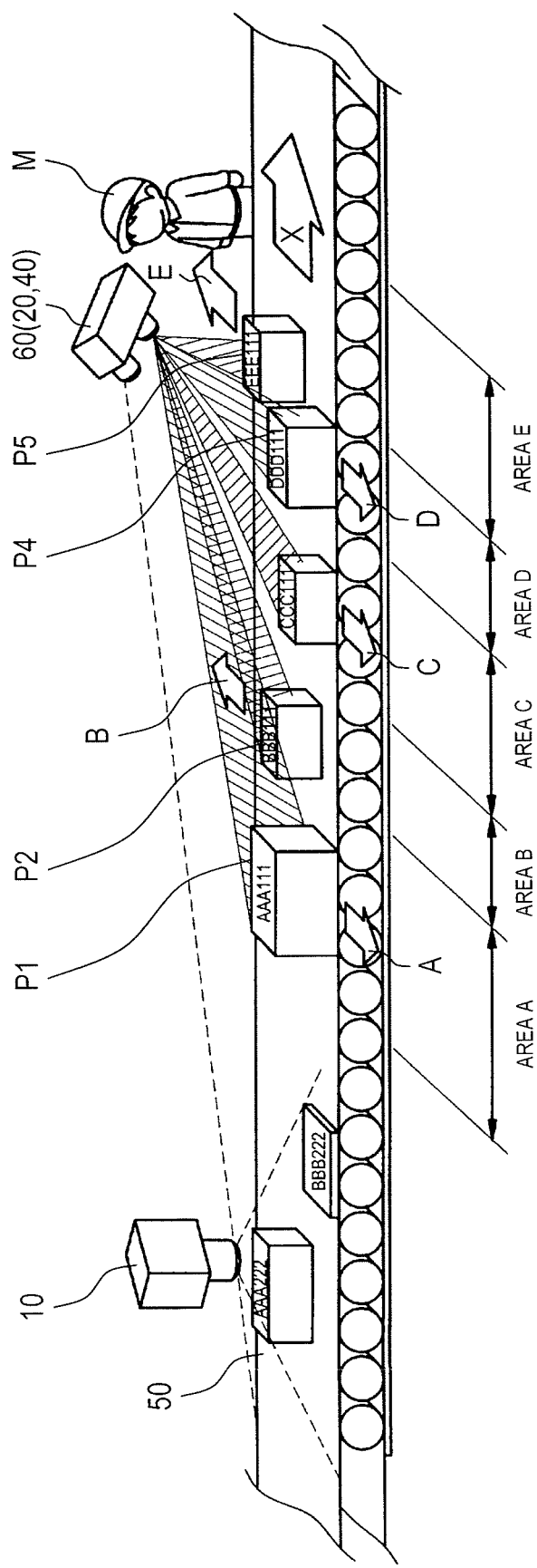
FIG. 3A is a conceptual diagram illustrating a status in which the parcel sorting system is installed in a distribution center and is in operation.

FIG. 3A is a conceptual diagram illustrating a status in which parcel sorting system 100 is installed in the distribution center and is in operation. In the related art, each of workers M visually checks the label attached to each of parcels P (denoted by P1 to P5 in FIG. 3A) transported by transport conveyor 50 in the arrow X-direction. When the parcel to be delivered by the worker himself arrives, worker M needs to pick up the parcel and places the parcel temporarily in the vicinity such as the worker's own feet, a basket, a truck bed. However, in a case of visually sorting by the worker, there is a limit in work efficiency of the worker, so that it is necessary to limit a transport speed to a predetermined value or less. As a result, a limit value of the amount of parcels which the worker can sort in a unit time decreases. In addition, due to an erroneous recognition when the worker visually checks the label, there is a possibility that an error may occur at the time of sorting. In recent years, the amount of parcel circulation has increased, and these problems receive more attention.

In the present embodiment, as illustrated in FIG. 3A, label reader 10 disposed above transport conveyor 50 reads the label attached to each of parcels P transported by transport conveyor 50. In the label, the label recording information including various information related to the parcel is described. The label recording information includes information similar to, a parcel identification number individually assigned to the parcel, a name, an address, and a telephone number of a sender, a name, an address, and a telephone number of a receiver, a parcel type, and the like. The label may be read by the worker in charge by manually placing a barcode reader as label reader 10 to a barcode in the label.

Further, distance image sensor 20 images the image (distance image) of parcel P transported by transport conveyor 50 and obtains information such as a position of parcel P, a distance to parcel P, a size (lengths of three sides when parcel P is rectangular parallelepiped) of parcel P, and the like. Further, positions of label reader 10 and distance image sensor 20, a type of the sensing device, and an order of processes are not particularly limited to the illustrated embodiments. As described above, in the present example, distance image sensor 20 and projector 40 are configured as an integrated imaging projection device 60 and are disposed above transport conveyor 50.

Instruction projecting device 30 (not illustrated in FIG. 3A, FIG. 3B) is configured by a computer disposed in, for example, the vicinity of transport conveyor 50 or another room and generates the projection image to be displayed on parcel P (for example, upper surface when parcel P is rectangular parallelepiped) based on the information, obtained by label reader 10, specifying the parcel and the distance image generated by distance image sensor 20. Instruction projecting device 30 sends a projection instruction to project the projection image on parcel P, to projector 40.

Projector 40 which receives the projection instruction, as an image output device, projects projection light including the projection image generated by instruction projecting device 30 on parcel P and displays the projection image on parcel P. Here, the projection image displayed on parcel P is, for example, an image of an arrow indicating sorting directions A, B, and C (right or left with respect to the transport direction of transport conveyor 50) corresponding to delivery addresses of parcels P (See FIG. 3B). Certainly, according to a status, various types of projection images are displayed. In the present disclosure, "image output device" is not limited to a device which directly projects a light beam on the parcel. In the present disclosure, "image output device" includes glasses which can display the image. That is, in the present disclosure, in a case of expressing as projecting projection light on the parcel, displaying the image on the parcel, projecting the image on the parcel, or the like, the expression also includes allowing the worker to recognize the image via the glasses capable of displaying the image in a pseudo manner as if the projection light is projected on the parcel. That is, in a case where the worker wears special glasses capable of displaying the image, the projection image of parcel P may be superimposed on the image of parcel P viewed via the glasses.

Hereinafter, in parcel sorting system 100 according to the embodiment, an outline of an operation of sorting the parcel performed by instruction projecting device 30 will be described.

[Outline of Operation]

Figure 4:
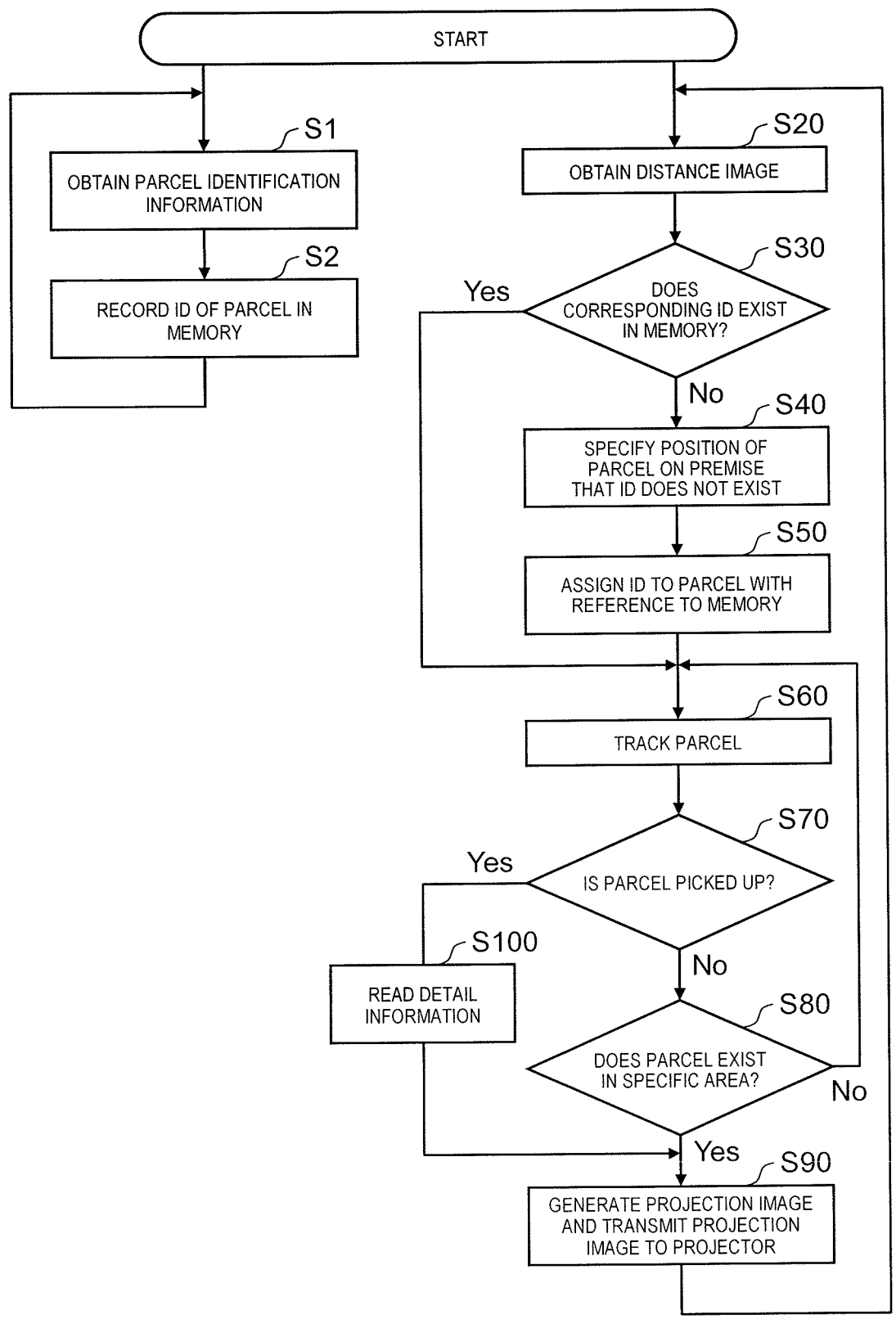
FIG. 4 is a flowchart illustrating an outline procedure of an operation mainly performed by the instruction projecting device.

FIG. 4 is a flowchart illustrating an outline procedure of an operation of mainly performed by instruction projecting device 30 of the present embodiment, particularly processor 34 of instruction projecting device 30. First, after label reader 10 reads the label recording information of the label of the parcel, input unit 32 of instruction projecting device 30 obtains the parcel identification information corresponding to the label recording information from label reader 10 (step S1). The parcel identification information is information including at least one piece of information similar to, the parcel identification number individually assigned to the parcel, the name, the address, and the telephone number of the sender, the name, the address, and the telephone number of the receiver, the parcel type, and the like. For the parcel identification information, processor 34 assigns an ID as a parcel identification number specifying the parcel and records the ID and time information corresponding to a time at which the ID is assigned, in memory 36 (step S2). The ID recorded in memory 36 may be the parcel identification number correctly recorded in the parcel identification information or may be assigned by instruction projecting device 30 generating a new ID.

On the other hand, in parallel with step S1 and step S2, after distance image sensor 20 images the distance image of the parcel, input unit 32 of instruction projecting device 30 obtains the distance image as the sensing information from distance image sensor 20 (step S20). Processor 34 determines whether or not the ID corresponding to the parcel existing in the distance image exists in memory 36.

An example of a method of determining whether or not the ID corresponding to the parcel existing in the distance image exists in memory 36 is as follows. That is, processor 34 calculates a time required for the parcel to move between label reader 10 and distance image sensor 20 based on a distance (assumed to be known) between label reader 10 and distance image sensor 20 and a speed of transport conveyor 50. By subtracting the time from a time when the distance image is obtained, a time when the ID is assigned to the parcel existing in the distance image by label reader 10 (or processor 34) can be estimated. It can be estimated that the ID assigned close to the estimated time is the ID corresponding to the parcel existing in the distance image. In addition, as another example, a method of installing another distance image sensor in the vicinity of label reader 10 may be possible. That is, by tracking the parcel, to which the ID is assigned, by using another distance image sensor installed in the vicinity of label reader 10 since label reader 10 assigns the ID (or processor 34), a distance between the parcel (or the ID) and label reader 10 is measured per a time unit. Processor 34 can estimate the ID of the parcel in the distance image obtained in a predetermined step S20 by the measured distance between the parcel (or the ID) and label reader 10, a distance of the parcel in the distance image obtained in step S20, and a distance (assumed to be known) between two distance image sensors.

In this way, processor 34 determines whether or not the ID corresponding to the parcel included in the distance image exists in memory 36 (step S30). That is, as described in step S2, in memory 36, the parcel identification information, the ID, and the time information corresponding to a time when the ID is assigned are recorded in advance. On the other hand, as described above, for example, processor 34 subtracts the time required for the parcel to move between label reader 10 and distance image sensor 20 from the time when the distance image is obtained, so that a time when the ID is assigned to the parcel existing in the distance image by label reader 10 (or processor 34) can be estimated. Processor 34 compares the time information recorded in memory 36 in advance and the estimated time. In a case where the time information is close to the estimated time (for example, case where time difference is equal to or smaller than predetermined time), processor 34 can determine that the ID corresponding to the parcel included in the distance image exists in memory 36. In a case where it is determined that the ID corresponding to the parcel exists in memory 36 (Yes in step S30), the process moves to step S60 and the subsequent steps.

In a case where it is determined that the ID corresponding to the parcel does not exist in memory 36 (No in step S30), on the premise that the ID is not assigned to the parcel, processor 34 specifies the position of the parcel again (step S40) and assigns the ID to the parcel (step S50). The processes of steps S30 to S50 will be further described below in detail.

Further, processor 34 tracks the parcel, to which the ID is attached, transported and moved by transport conveyor 50 based on the distance image from distance image sensor 20 obtained by input unit 32 per a predetermined interval (step S60). Based on the same distance image, processor 34 determines whether or not the worker picks up the tracked parcel (step S70). In a case where it is determined that the parcel is not picked up by the worker (No in step S70), processor 34 determines whether or not the parcel exists in a specific area (specific area in which parcel is to be picked up) described below (step S80). In a case where it is determined that the parcel exists (reaches) in the specific area (Yes in step S80), processor 34 generates the projection image and transmits the projection image to projector 40 (step S90). In a case where it is not determined that the parcel exists (reaches) in the specific area (No in step S80), the process returns to step S60 and processor 34 continues to track the parcel.

In addition, in step S70, in a case where it is determined that the parcel is picked up by the worker (Yes in step S70), processor 34 reads detail information of the parcel from memory 36 (step S100), generates the projection image including the detail information, and outputs the projection image generated by output unit 38, to projector 40 (step S90). Projector 40 which obtains the projection image from instruction projecting device 30, projects the projection image on the corresponding parcel.

The above is the outline of the operation procedure performed by processor 34 and the like of instruction projecting device 30, and a detailed procedure of each of the processes will be described below.

[Obtainment of Distance Image]

Processor 34 can track a movement of the parcel by processing data of all of areas of the distance image obtained by distance image sensor 20. However, the data obtained by distance image sensor 20 also includes much data not related to the movement of the parcel. It takes much time to process all of the areas of the captured distance image. In view of this, processor 34 does not necessarily need to process data of all of the distance images obtained by distance image sensor 20. In the present embodiment, processor 34 processes only some of the areas among the areas of the distance image obtained by distance image sensor 20, so that a processing load of processor 34 itself is reduced.

Figure 5:
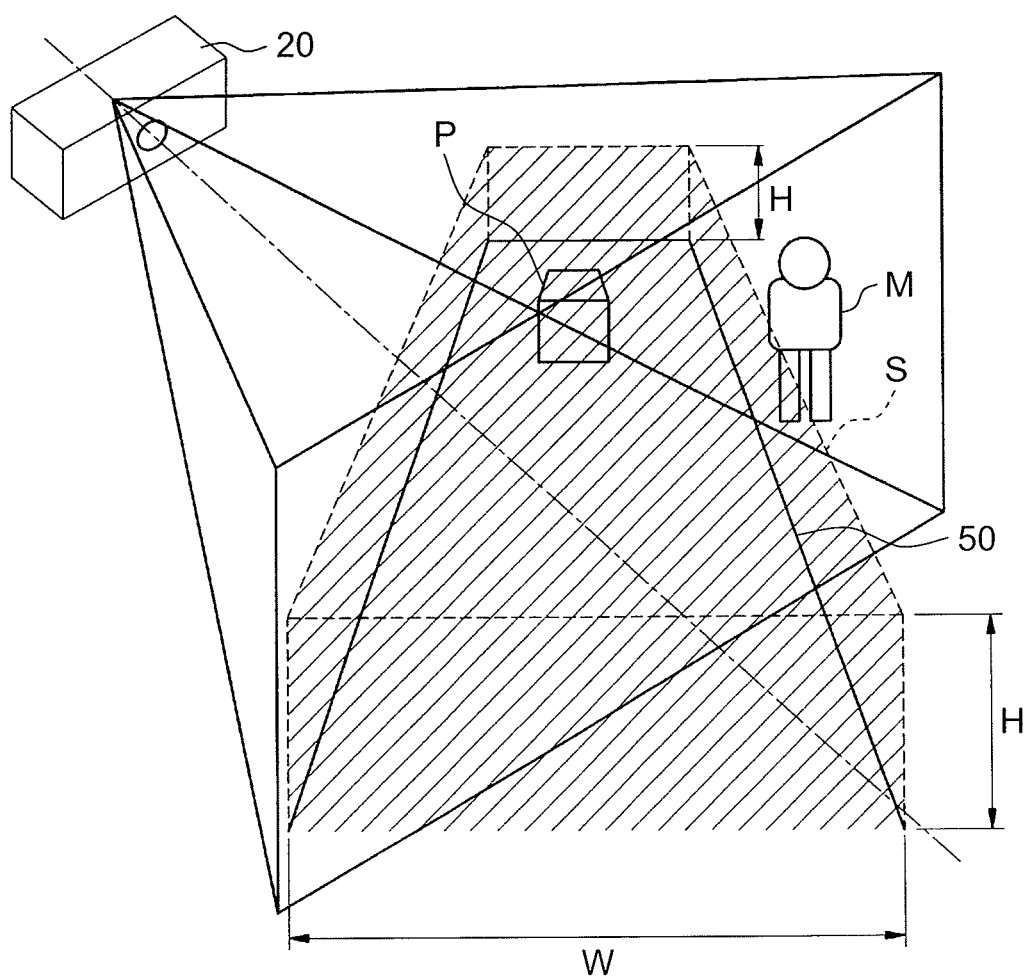
FIG. 5 is a conceptual diagram illustrating a processing target space to be processed by the instruction projecting device.

FIG. 5 is a conceptual diagram illustrating processing target space S which is an aggregation of coordinate points corresponding to pixels to be processed by instruction projecting device 30 in the distance image obtained by distance image sensor 20. An object to be sorted by parcel sorting system 100 is parcel P on transport conveyor 50. If parcel P can be recognized, the original purpose can be achieved. In the present embodiment, among the areas of the distance image obtained by distance image sensor 20, a processing target of processor 34 of instruction projecting device 30 is limited to only processing target space S which is a part of the area, so that the load of processor 34 is reduced. The coordinate point of the distance image obtained by distance image sensor 20 is defined as (x, y, d) which is configured by coordinate positions x and y of a plane and d which is a depth. A value of the coordinate point $(x_i, y_i, d_i)$ which defines processing target space S can be calculated based on measurement performed in advance and stored in memory 36 or the like. Processor 34 can perform the processes illustrated in FIG. 6 with reference to the value of the coordinate point ($x_i$, $y_i$, $d_i$) recorded in memory 36.

In the present embodiment, processing target space S is defined by a space partitioned by a range from transport conveyor 50 to predetermined height H and width W, inside a plane of transport conveyor 50. It is conceivable that parcel P on transport conveyor 50 can be captured in the space. A range of height H is not particularly limited thereto, but as height H increases, the processing load of processor 34 increases. If height H is too small, there is a possibility that it is difficult to capture parcel P. Therefore, height H is set to approximately 50 cm, for example, but height H is not particularly limited thereto. Width W is not limited to a width itself of the actual transport conveyor, width W may be a value obtained by adding or subtracting a predetermined extra width, or may have a slight error.

Figure 6:
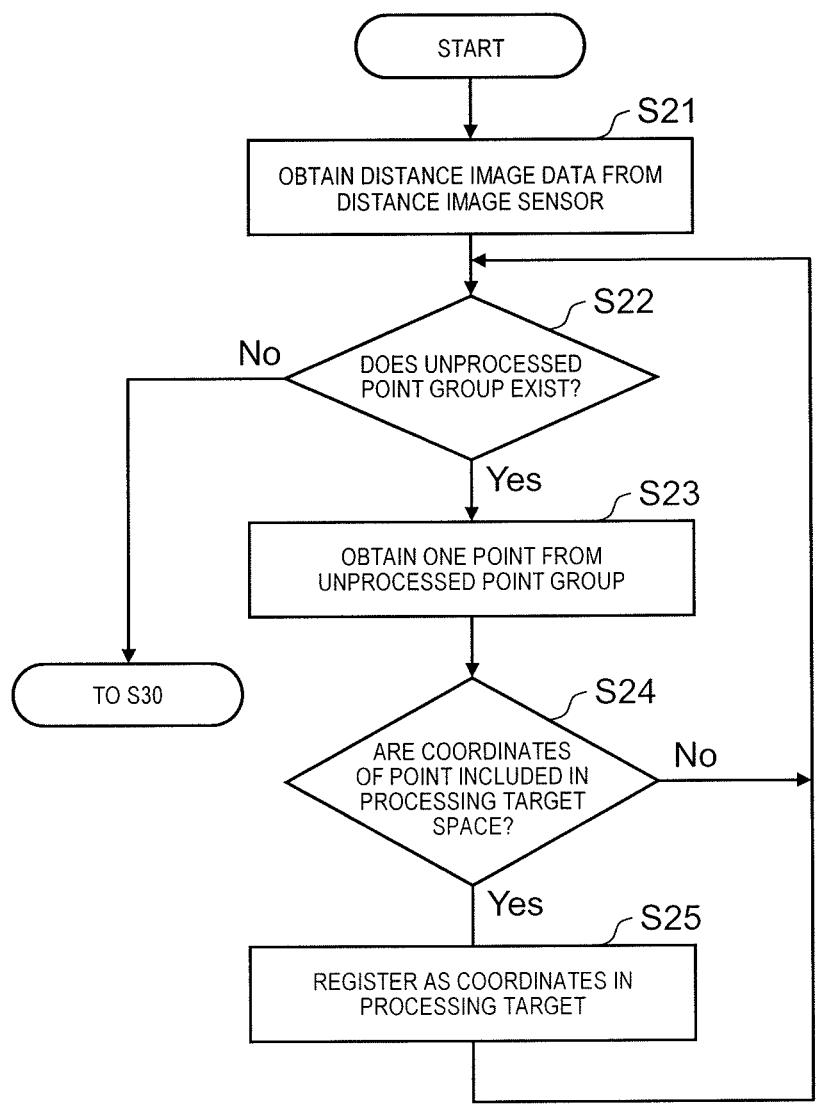
FIG. 6 is a flowchart illustrating a detailed procedure of step S20 of FIG. 4.

FIG. 6 is a flowchart illustrating a detailed procedure of an operation performed by processor 34 by cooperating with memory 36 when obtaining the distance image in step S20 in FIG. 4. First, processor 34 obtains data of the distance image from distance image sensor 20 (step S21). Processor 34 determines whether or not an unprocessed point group, which is a group of the coordinate points on which the process is not yet performed, exists with reference to the value of the coordinate point ($x_i$, $y_i$, $d_i$) recorded in memory 36 (step S22). In a case where the unprocessed point group does not exist (No in step S22), the process moves to step S30.

In a case where the unprocessed point group exists (Yes in step S22), processor 34 obtains one coordinate point from the unprocessed point group (step S23). Processor 34 determines whether or not the obtained coordinate point is included in processing target space S (step S24). In a case where the coordinate point is not included in processing target space S (No in step S24), after adding information indicating that the coordinate point is processed to the coordinate point, the process returns to step S22. Then, processor 34 again determines whether or not the unprocessed point group exists in the distance image. In addition, in a case where the coordinate point obtained in step S23 is included in processing target space S (Yes in step S24), processor 34 records (registers) the coordinate point as a processing target coordinate point included in processing target space S, in memory 36 (step S25). Information indicating that the coordinate point is processed, is added to the coordinate point.

Figure 7:
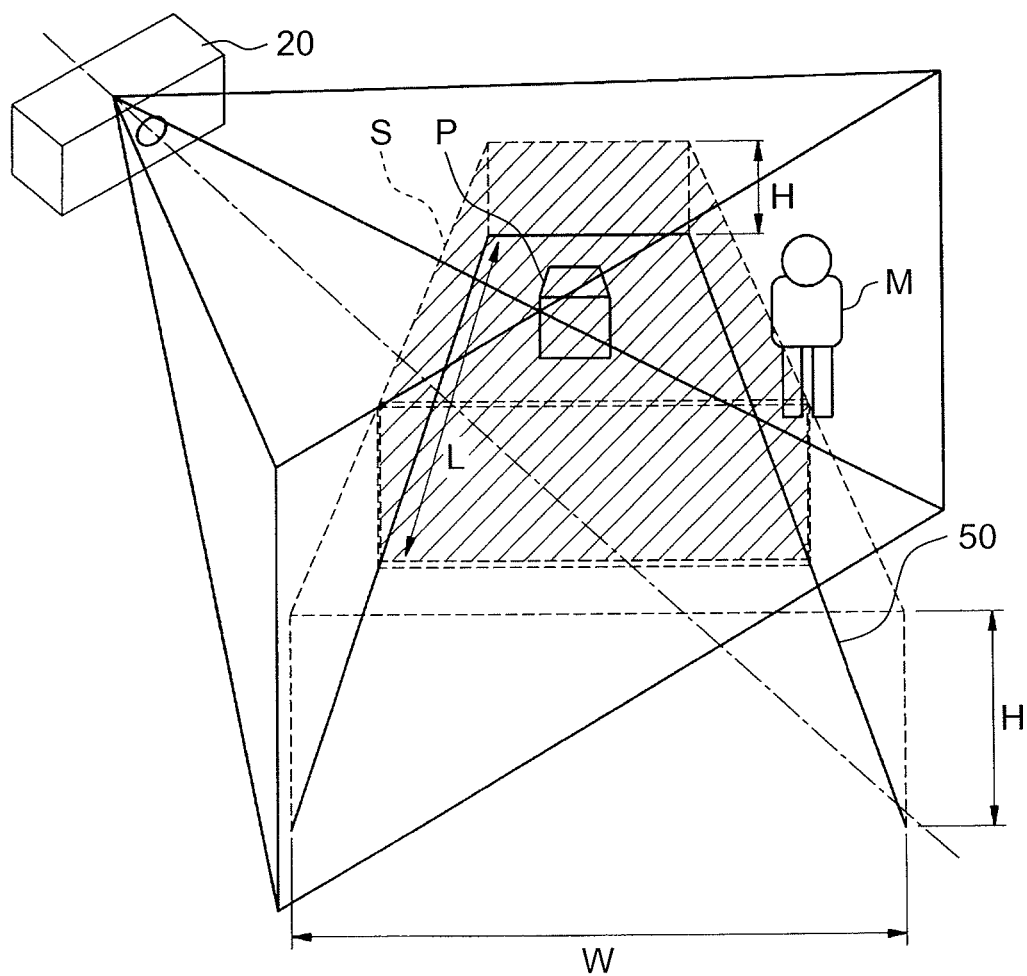
FIG. 7 is a conceptual diagram illustrating a modification example of the processing target space.

FIG. 7 is a conceptual diagram illustrating a modification example of processing target space S. In the present example, processing target space S is further limited to be partitioned by a range of predetermined length L in the transport direction of transport conveyor 50. Accordingly, the number of the coordinate points to be processed by processor 34 can be reduced and the processing load of processor 34 can be reduced. As time elapses, one distance image sensor 20 may change an area corresponding to predetermined length L to be imaged and each of the plurality of distance image sensors 20 may image the area corresponding to predetermined length L corresponding to each of the plurality of distance image sensors 20.

Figure 8:
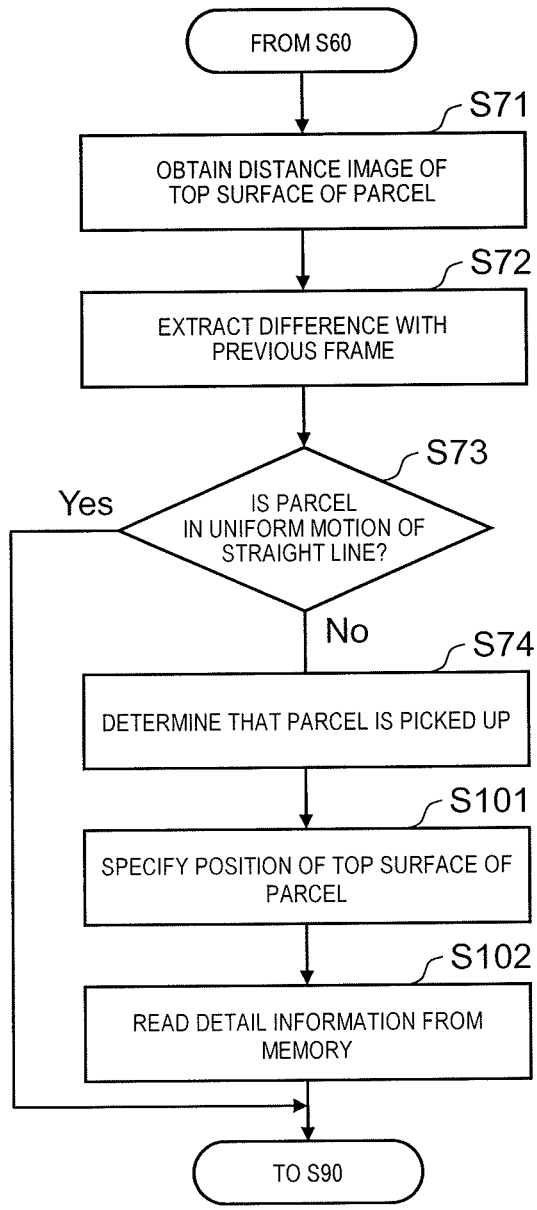
FIG. 8 is a flowchart illustrating a detailed procedure in steps S70 and S100 in FIG. 4.

According to the present embodiment, processor 34 decreases the processing targets by limiting processing target space S to be processed and it is possible to effectively and precisely sort the parcel as a result. Further, for example, in a case where the processes in FIGS. 5 to 7, in particular, the determination process in step S24 is not performed since processing capability of processor 34 is high, step S20 becomes an operation of simply obtaining the distance image as the sensing information and in the subsequent processes, basically all of the coordinate points of the obtained distance image become the processing target. As a result, step S100 in FIG. 4 in which the parcel picked up from transport conveyor 50 becomes target and steps S101 and S102 in FIG. 8 illustrated below can be executed. Surely, this fact does not deny the ideas in FIGS. 5 to 7, and according to FIGS. 5 to 7, it is possible to reduce the processing load of processor 34, which is an operational effect independent of the operational effect of steps S100 to S102. From an opposite point of view, by applying the embodiment in FIGS. 5 to 7, the operations in steps S100 to S102 are not performed in principle, but this does not mean that the ideas in steps S100 to S102 are denied.

[Assignment of ID]

When input unit 32 of instruction projecting device 30 obtains the parcel identification information corresponding to the label recording information from label reader 10 (step S1), generally, the ID corresponding to the parcel identification information (parcel identification number) is assigned and recorded in memory 36 (step S2). However, in a case where label reader 10 fails to read the label or each of the labels to be read is not attached to the parcel, the ID corresponding to the distance image of the parcel does not exist in memory 36 even if the distance image of the parcel is obtained in step S20 (No in step S30). In this case, on the premise that the ID is not assigned to the parcel, processor 34 obtains the distance image of the parcel from distance image sensor 20 and specifies the position of the parcel again (step S40), and assigns the ID to the parcel and records the ID in memory 36 (step S50). After then, processor 34 tracks the parcel, to which the ID is attached, transported and moved by transport conveyor 50 based on the distance image from distance image sensor 20 obtained by input unit 32 per the predetermined interval (step S60).

[Extraction of Projected Surface]

When processor 34 tracks the parcel after the ID is assigned to the parcel (step S60), processor 34 can track the movement of the parcel based on the distance image of the whole image of the parcel obtained by distance image sensor 20. However, since the amount of data of the distance image of the whole image is large, there is a possibility that tracking of the parcel has a high processing amount and may be difficult based on the distance image of the whole image. In addition, there is no need to limit the distance image of the whole image to be required for tracking the parcel, and in step S90 in FIG. 4, it is conceivable that it is sufficient if a projected surface on which the projection image is to be projected, can be tracked. In the present embodiment, in step S60, processor 34 extracts the projected surface which is a specific surface on which the projection image is to be projected, from the distance image of the whole image of the parcel obtained by cooperating with memory 36 and tracks the parcel based on only the extracted projected surface. In this way, if the parcel is tracked based on only the projected surface (specific surface) extracted from the parcel, it is possible to track the parcel with smaller processing amount than processing amount in a case of tracking the parcel based on all of the projected surfaces. In the present disclosure, by performing a process (including generation of projection image itself) required for generating the projection image other than tracking of the parcel, based on only the specific surface, a load of processor 34 is reduced.

A typical example of the projected surface is an upper surface (top surface) of the parcel of an approximately rectangular parallelepiped. Processor 34 can extract the upper surface based on a point group of coordinates having a constant height among the distance images. In addition, processor 34 can extract the upper surface based on a point group of coordinates constituting a surface parallel with transport conveyor 50 among the distance images.

The projected surface may be, for example, one side of the parcel having a rectangular parallelepiped shape. Processor 34 can extract the side surface based on a point group of coordinates constituting a surface perpendicular to transport conveyor 50 among the distance images. In the method described above, since an upper end of the side surface is defined by extracting the upper surface in advance, it is preferable to extract the upper surface in advance to extract the side surface.

A direction of the projected surface can be defined in accordance with a speed vector obtained by a movement track of the parcel.

In addition, the upper surface or the side surface of the parcel in an approximately rectangular parallelepiped shape can be extracted by obtaining a circumscribed rectangular parallelepiped of the parcel. "Circumscribed rectangular parallelepiped" is a rectangular parallelepiped having sides parallel to an inertial main axis direction and is the smallest rectangular parallelepiped into which the parcel enters, that is, a rectangular parallelepiped in which each of six surfaces of the rectangular parallelepiped is contacted with the surface of the parcel at least one point. Processor 34 develops coordinates of the distance image of the parcel in a three-dimensional matching space, generates the circumscribed rectangular parallelepiped of the final image of the coordinates of the parcel developed, and calculates the dimensions of three sides of the circumscribed rectangular parallelepiped. As a result, it is possible to obtain the upper surface and the side surface of the parcel.

The projected surface is selected in a predetermined manner. In the case of the parcel having a shape other than a rectangular parallelepiped, various selectable surfaces are conceivable. In addition, it is also possible to select the projected surface in consideration of convenience of the worker. For example, in a case where there is a parcel at a position far from the worker, processor 34 can select a front surface (side surface closest to worker in case of rectangular parallelepiped parcel) viewed from the worker as the projected surface. In addition, in a case where there is a parcel at a position close to the worker, processor 34 can select the upper surface as the projected surface. According to this process, after step S90, projector 40 can project the projection image on a surface to be most easily recognized by the worker. In addition, a position of the worker around the parcel is also recognized at the same time and the projected surface may be switched based on the information.

Further, by narrowing down the projected surface to only one surface, the processing load of processor 34 can be reduced and it is possible to generate the projection image suitable for the selected surface later.

According to the present embodiment, by extracting the projected surface on which the projection image is to be projected, processor 34 does not need to perform the process, on the distance image displaying the whole parcel and the processing load is reduced. However, unless there is a problem in the processing load, not only one surface but also a plurality of surfaces may be selected as the projected surface and projector 40 may project the projection image on a plurality of projected surfaces in step S90. Therefore, the specific surface on which the projection image is to be projected includes not only one surface but also the plurality of surfaces.

However, even if the projected surface is not extracted as in the present embodiment, as long as processor 34 operates, the processes after step S70 is possible. Therefore, the processes described below are not necessarily based on the premise of extracting of the projected surface.

[Determination of Projection Position]

Further, processor 34 tracks the parcel. In a case, basically, where the parcel is not picked up (No in step S70) and the parcel exists in the specific area described below (Yes in step S80), processor 34 generates the projection image corresponding to the parcel and transmits the projection image to projector 40 (step S90). Processor 34 can determine a position at which the projection image is projected, with a position at which the distance image is lastly obtained.

However, since it takes some time to generate and obtain the distance image and the parcel is moved by transport conveyor 50 per the time, in a case where the projection image is projected on the position at which the distance image is lastly obtained, in fact, there is also a possibility that the parcel has already moved from that position. As the moving speed of the parcel is particularly fast, a difference between the actual position of the parcel and the position at which the distance image is lastly obtained becomes large, so that there is a high possibility that the projection position at which the projection image is to be projected deviates from an original position.

In the present embodiment, processor 34 predicts a predicted projection position which is a position at which the projection image is projected in accordance with the moving speed at which the parcel moves and the already obtained position of the parcel and projects the projection image at the predicted projection position to appropriately project the projection image on the parcel.

In step S20 in FIG. 4, processor 34 assigns time stamp TS1 which is first time information corresponding to a time at which distance image sensor 20 obtains the distance image, to the distance image and records time stamp TS1 in memory 36. Further, when generating the projection image (step S90), processor 34 obtains time stamp TS2 which is second time information corresponding to the time when generating the projection image and calculates a difference between TS1 when obtaining the distance image and TS2 when generating the projection image, that is, a difference between the first time information and the second time information (TS2−TS1). Processor 34 can obtain the projection position of the parcel on which the projection image is to be correctly projected, based on the difference by cooperating with memory 36. In the present disclosure, "corresponding to time" is not limited to only representing one point in time. "Corresponding to time" includes a case of representing a time deviated from a time of occurrence of a certain event by a predetermined period of time.

Specifically, in a case where the moving speed of the parcel (transport speed by transport conveyor 50) is v, moving distance D that the parcel moves can be calculated by D=(TS2−TS1)×v. Moving distance D may be calculated as a directional distance (example: 2 cm in east direction) and also may be calculated as a particularly undetermined distance in a case where the moving direction of the parcel is substantially the same as the transport direction of transport conveyor 50 (moving speed v may be determined to be directional speed so as to calculate moving distance D as directional distance). Predicted projection position P2 of the parcel on which the projection image is projected can be obtained by adding moving distance D to position P1 of the distance image.

In order to make it possible to calculate moving distance D described above, it is necessary to determine a value of moving speed v by estimation or actual measurement. In order to determine the value of moving speed v, the following method can be adopted.

1) When tracking the parcel (S60), moving speed v is calculated by the moving distance and the direction per hour.
2) Seeing that the parcel moves at a predetermined speed and direction, the speed is set to moving speed v.
3) The transport speed and the direction of the conveyor is monitored by an output of the motor and the like and the speed is set to moving speed v (it is assumed that speed of parcel is equal to speed of conveyor).

By calculating moving distance D as described above, processor 34 calculates predicted projection position (P1+D) which is a position at which the projection image is projected. According to the present embodiment, projector 40 can more precisely project the projection image on the parcel along the movement of the parcel and the projection of the image is seen to be smooth even if eyes of the human see the image.

Moving distance D may be calculated by D=(TS2+Δt−TS1)×v. Here, Δt can be a transmission time of the projection image from instruction projecting device 30 to projector 40. Alternately, Δt may be a delay time due to the process inside the projector. Further, Δt can be a time obtained by adding the delay time by the process inside the projector, to transmission time of the projection image from instruction projecting device 30 to projector 40. By determining Δt in this way, it is possible to calculate the predicted projection position more precisely.

[Projection on Specific Area]

In the present embodiment, further, in step S80 in FIG. 4, it is determined whether or not to project the projection image according to the position of the tracked parcel or it is determined whether or not to change the projection image. According to this process, on transport conveyor 50, in a case of moving the parcel to the specific area (specific section) in which the parcel becomes a sorting target, projector 40 projects the projection image on the parcel or changes the projection image as compared with a case where the parcel exits outside the specific area.

The parcel identification information read by label reader 10 includes at least one piece of information similar to, the parcel identification number individually assigned to the parcel, the name, the address, and the telephone number of the sender, the name, the address, and the telephone number of the receiver, the parcel type, and the like. The information is recorded in memory 36 in association with the ID of the parcel as described in step S2 or step S50.

The specific area in which the parcel is to be picked up, corresponds to an area in which the worker picks up the parcel from transport conveyor 50. In the present embodiment, as illustrated in FIG. 3A, the area on transport conveyor 50 is partitioned into five specific areas of area A, area B, area C, area D, area E, which are areas defined by specific lengths of transport conveyor 50 in the transport direction X.

The following methods can be adopted so as to determine whether or not the specific parcel is the sorting target in which specific area on transport conveyor 50 based on the parcel identification information recorded and the specific area partitioned as described above.

First, there is a method of recording the parcel identification information in association with each of the specific areas in advance, in memory 36. For example, it is conceivable to record that "if parcel is parcel to AA zone, parcel becomes sorting target in area A", in memory 36.

Second, there is a method of (1) specifying the worker who exists in the specific area and (2) recording the parcel identification information in association with each of the workers in advance, in memory 36. In order to specify the worker, an input device may be provided in each of the specific areas and a worker ID may be registered (or registered by obtaining the worker ID from a wireless device possessed by the worker) to the worker. As another method, the worker ID may be specified from the distance image or an image including the specific area and the worker separately obtained using an image recognition technology. In addition, as another method, a specific worker may be specified as the specific worker exists in the specific area at a predetermined time. In order to associate the parcel identification information with each of the workers in advance, for example, it may be conceivable to record that "worker A sorts parcel to AA zone", in memory 36. By integrating the data using the above information, processor 34 can determine that "if parcel is parcel to AA zone, parcel becomes sorting target in area A".

Third, there is a method of (1) specifying a transport truck close to each of the specific areas and (2) recording the parcel identification information in association with each of the transport trucks in advance, in memory 36. In order to specify the transport truck close to each of the specific areas, the transport truck may be specified by specifying a license plate and a marker attached to the truck using the image recognition technology, from the distance image or an image including the specific area and the transport truck separately obtained or may be specified by specifying a predetermined transport truck which exists in a predetermined area at a predetermined time. In order to associate the parcel identification information with each of the transport trucks in advance, for example, it may be conceivable to record that "transport truck A sorts parcel to AA zone", in memory 36. By integrating the data using the above information, processor 34 can determine that "if parcel is parcel to AA zone, parcel becomes sorting target in area A".

As described above, processor 34 can determine whether or not the specific parcel is the sorting target in which specific area on transport conveyor 50 based on the parcel identification information.

In step S80 of FIG. 4, processor 34 determines whether or not the specific parcel exists in the specific area in which the parcel is to be picked up, based on the parcel identification information. In a case where it is determined that the parcel exists (reaches) in the specific area (Yes in step S80), processor 34 generates the projection image and transmits the projection image to projector 40. In a case where it is not determined that the parcel exists (reaches) in the specific area (No in step S80), the process returns to step S60 and processor 34 continues to track the parcel.

In a case where the parcel moves inside the specific area (specific section) in which the parcel is to be sorted, a case where the projection image is projected on the parcel, will be described by using FIG. 3A, FIG. 3B. As illustrated in FIG. 3A, there are five parcels P1 to P5 which are the projection targets of the projection image, on transport conveyor 50. In the present embodiment, only after each of the parcels reaches the specific area in which the parcel is to be picked up, projector 40 (imaging projection device 60) projects the projection image on the parcel.

In FIG. 3A, the worker in charge of picking up the parcel stands beside transport conveyor 50 in each of the areas and the parcel arriving each of the areas is picked up from transport conveyor 50 as indicated by arrows A, B, C, D, and E. In FIG. 3A, the person in charge of area A, area C, and area D stands on a right side of transport conveyor 50 with reference to the transport direction X and the person in charge of area B and area E stands on a left side of transport conveyor 50, for convenience, the person in charge other than person M in charge of area E is not illustrated.

For example, parcel P1 has the parcel identification information of "AAA111" on the label. Based on the method described above, the parcel identification information of "AAA111" specifies that the parcel is the sorting target in area A. Here, when parcel P1 reaches (specific) area A, processor 34 transmits the generated projection image to projector 40. Projector 40 projects the projection image on parcel P1. The worker in area A can easily pay attention to parcel P1, to be picked up by the worker, which reaches the specific area of the worker, accordingly, the parcel can be sorted more efficiently and precisely.

In the present embodiment, as illustrated in FIG. 3A, whether or not one projector 40 projects the image on a plurality of specific areas may be switched and whether or not a plurality of projectors 40 project the image on each of the specific areas may be switched.

Figure 3B:
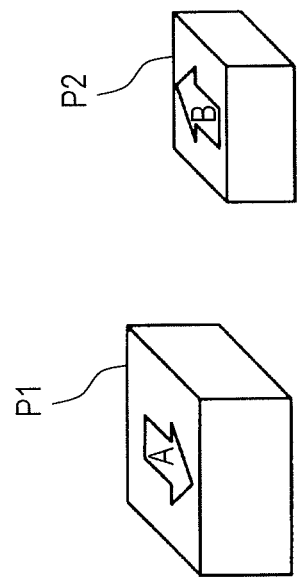
FIG. 3B is a diagram illustrating a state in which a projection image including an arrow is projected on an upper surface of a parcel.

According to the example illustrated in FIG. 3A, FIG. 3B, by projecting only in a case where the parcel moves inside the specific area in which the parcel is to be sorted, it becomes easy for the worker to specify the parcel to pick up. On the other hand, in a case of projecting irrespective of conditions on all of the parcels, it is necessary to prepare the projection images of various patterns so that the worker can easily distinguish the parcel. However, it is also conceivable that a high degree of design capability is required for the projection image for distinguishing the parcel according to the number of the workers or the delivery addresses. However, according to the present embodiment, by limiting the parcel to be projected, it is possible to minimize the number of the patterns of the projection image.

The method of the present disclosure is not limited to performing projection only when the parcel exists in the specific area. Also in a case where the parcels exist both inside and outside the specific area, the projection is performed on the parcel, but when the parcel exists inside the specific area, the present disclosure may be applied so as to change the projection image as compared with a case where the parcel exists outside the specific area.

As the present embodiment, the process in step S90 is possible as long as processor 34 operates without determining whether or not the parcel exists in the specific area. That is, the projection image may always be generated and projected. Therefore, the processes described below are not necessarily based on the premise of the present process (determination of existence within specific area of parcel).

[Generation of Projection Image Including Arrow]

When generating the projection image in step 90 in FIG. 4, considering workability of the worker who picks up the parcel, processor 34 can generate the projection image including an arrow as an image indicating a direction in which the worker exists, that is, a direction to pick up the parcel.

In the present embodiment, corresponding to each of the specific areas, the direction to pick up the parcel in each of the specific areas is recorded in memory 32. That is, the direction is recorded in memory 32 so that in a case of area A, the direction to pick up the parcel is right to the direction X and in a case of area B, the direction to pick up the parcel is left to the direction X.

As described above, according to the method of determining whether or not the specific parcel is to be the sorting target in which specific area on transport conveyor 50, since it is possible to determine whether or not the specific parcel is to be the sorting target in which specific area, it is possible to determine that the specific parcel is picked up in which direction on the transport conveyor. That is, processor 34 can determine the direction to pick up the parcel from the parcel identification information. Therefore, processor 34 can define an arrow image to be projected based on the determination. In the present embodiment, although the example of the projection image indicating the direction to pick up the parcel is described by using the arrow, the image indicating the direction to pick up the parcel is not limited thereto. For example, as the example of the projection image indicating the direction to pick up the parcel, an image constituting a picture scrolled toward a predetermined direction can be used and an image configured by a predetermined direction with a color different from colors of the other directions can be used.

There is an example of the specific method of generating the projection image. For example, template images of arrows in two directions (right side and left side of transport conveyor) are recorded in memory 36 in advance, and processor 34 selects any one of the template images from the transport direction and the parcel identification information of the parcel and generates the projection image including the arrow. In addition, for example, an image of a rotatable arrow in free direction may be recorded in memory 36 in advance, and processor 34 may rotate the image of the rotatable arrow in an appropriate direction and generate the projection image including the arrow from the transport direction and the parcel identification information. As a result, as illustrated in FIG. 3B, it is possible to project the projection image including the image of arrow A and the image of arrow B on the upper surfaces of parcels P1 and P2.

Further, based on size of the projected surface extracted in step S50, processor 34 may change the size or the shape of the image indicating the direction to pick up the parcel. In this way, it is possible to prevent the direction indicating the image indicating the direction to pick up the parcel from not being displayed on the projected surface and it is possible to prevent the arrow from being projected small on the projected surface more than needs.

According to the present embodiment, it is possible to generate the projection image for the worker easily identifying the parcel to be picked up by the worker himself and it is possible to suppress a miss of the sorting work and to improve efficiency. However, the generation of various arrows in the present embodiment is not necessary for another embodiment and it is also possible to project information of another pattern other than the arrow indicating the direction to pick up the parcel.

[Assignment of Detail Information]

FIG. 8 is a flowchart illustrating a detailed procedure of the operation performed by processor 34 in steps S70 and S100 in FIG. 4. Generally, when worker M in FIG. 3 loads picked up parcel P into the truck, worker M temporally puts down the parcel in the vicinity of worker M such as feet and loads parcel P considering a delivery order. For example, the worker generally loads the last parcel to be delivered into an innermost position of the truck bed and loads the first parcel to be delivered at a position near an exit of the truck bed. In consideration of requiring proficiency in the loading or information on a delivery area, and rotation of the worker in charge or the like, it is difficult to maintain constant efficiency.

In the present embodiment, for particularly the parcel picked up from transport conveyor 50, further detail information is obtained and the detail information is projected on the parcel. Since the worker can easily recognize order of loading the parcel into the truck by seeing the projection image including the detail information, the worker can efficiently load parcel P into the truck and it is possible to improve efficiency of the loading work.

Step S71 to step S74 in FIG. 8 correspond to step S70 in FIG. 4. Processor 34 continues step S60 of tracking the parcel and obtains the distance image of the upper surface of the parcel (step S71). Here, distance image sensor 20 images the distance image by one frame for each of predetermined times. Processor 34 receives the distance image by one frame and extracts a difference between the distance image of the previous frame and the distance image of the subsequent frame (step S72). In the present embodiment, a difference between the parcel in the distance image of the first frame and the parcel in the previous frame is extracted and it is determined whether or not the parcel is in uniform motion of straight line from the difference (step S73).

While transport conveyor 50 moves in the arrow X-direction in FIG. 3 and the parcel is transported on transport conveyor 50, the parcel should also move in uniform motion of straight line in the arrow X-direction. That is, since the parcel is imaged in a state in which the parcel is in uniform motion of straight line in the arrow X-direction, it is possible to detect the parcel uniform motion of straight line of the parcel from the previous and subsequent frames. In a case where it is determined that the difference indicates parcel the uniform motion of straight line (Yes in step S73), processor 34 generates the projection image (step S90).

On the other hand, in a case where it is determined that the difference does not indicate the uniform motion of straight line (No in step S73), processor 34 determines that the parcel is picked up from transport conveyor 50 by the worker (step S74). Certainly, after it is determined that the difference does not indicate the uniform motion of straight line, the distance image of the parcel may be tracked and the parcel may be detected to be separated from transport conveyor 50, in order to determine that the parcel is picked up by the worker.

Step S101 to step S102 in FIG. 8 correspond to step S100 in FIG. 4. When it is determined that the parcel is picked up (step S74), processor 34 specifies a position of the upper surface of the parcel again (step S101). Processor 34 reads the detail information, related to the parcel, recorded in memory 36 in advance (step S102). Although the detail information includes various information, here, the detail information is useful information for loading the parcel by the worker. For example, it is the detail information of the delivery address such as a lower address level than a street name of the delivery address. Since the read detail information is included in the projection image in step S90, convenience of sorting by the worker is improved. That is, the detail information is information including a location at which the parcel is to be disposed corresponding to the parcel identification information.

Particularly, the detail information may include information indicating where the worker temporally places the parcel. For example, in a case where the worker places the parcel in the vicinity of the feet before placing the parcel in the truck bed, the detail information may include position information of the location at which the parcel is placed in the vicinity of the feet. In a case where the worker directly places the parcel in the truck bed, the detail information may include information or the like of a specific position at which the parcel is placed in the truck bed.

Although the detail information is read from the label of the parcel by label reader 10 and is recorded in memory 36, an obtaining method is particularly not limited thereto. The detail information may be obtained from another recording place via a network.

Further, in the present embodiment, by tracking the image of the parcel, it is determined whether or not the parcel is picked up, but a behavior analysis technology can also be applied as another example. That is, by recording operation patterns related to behaviors such as contact of the worker with the parcel, picking up of the parcel, taking away of the parcel, and the like in memory 36 or the like in advance, it is possible to determine that the parcel is picked up in a case where processor 34 detects the operation of the worker similar to the operation patterns. In addition, in a case where a part of the parcel is come out from processing target space S illustrated in FIG. 5, it is also possible to determine that the parcel is picked up.

Further, in the present embodiment, instruction projecting device 30 projects the projection image by tracking the parcel come out from processing target space S illustrated in FIG. 5, for example. When implementing such an embodiment, as described above, basically, all of the coordinate points of the distance image are the processing targets. Because, since the processes in FIGS. 5 to 7, particularly, the process in step S24 of FIG. 6, are not performed, the operation in FIG. 6 is not performed. For example, in a case of performing the processes in FIGS. 5 to 7, particularly, the determination process in step S24 considering the processing load of processor 34, since the parcel picked up from transport conveyor 50 is basically excluded from the processing target, steps S100 to S102 are not executed. Surely, the non-execution does not deny the idea of the processes of steps S100 to S102. By the processes of steps S100 to S102, it is possible to obtain an operational effect of improving efficiency of the loading work by the detail information, which is independent of the operational effect of FIGS. 5 to 7 and step S24. On the other hand, in order to apply the embodiment in steps S100 to S102, the operations in FIGS. 5 to 7 and step S24 are not performed in step S20 in principle, but this does not mean that the ideas in FIGS. 5 to 7 and in step S24 are denied.

According to the present embodiment, it is possible for the worker to recognize more detailed attributes related to the parcel as well as whether or not to pick up the parcel with reference to the detail information and it is possible to improve efficiency of the sorting of the parcel and the loading of the parcel. However, assignment of the detail information such as the present embodiment is not necessary for implementation of other embodiments.

Further, in the embodiment described above, distance image sensor 20 obtains the distance image and instruction projecting device 30 processes the distance image and generates the projection image. However, the image to be obtained is not necessarily limited to the distance image, and depending on a type of the process, a two-dimensional image not including the distance information may be the processing target. Therefore, distance image sensor 20 may be an image sensor which obtains the two-dimensional image and instruction projecting device 30 can process the two-dimensional image of the light processing load.

[Summary of Embodiment]

As described above, instruction projecting device 30 of the present embodiment generates the projection image to be projected on the parcel based on an image including the parcel and parcel identification information specifying the parcel in the image. Instruction projecting device 30 includes: processor 34; and memory 36, in which by cooperating with memory 36, processor 34 obtains the first time information corresponding to a time of obtaining the image, generates the projection image to be projected on the parcel, obtains the second time information corresponding to a time of generating the projection image, and calculates the position on which the projection image is projected based on the difference between the first time information and the second time information.

Accordingly, instruction projecting device 30 can obtain the projection position of the parcel to which the projection image is to be correctly projected. As a result, projector 40 can more precisely project the projection image on the parcel along the movement of the parcel and the projection of the image is seen to be smooth even if eyes of the human see the image.

Processor 34 may further calculate the position on which the projection image is projected based on the moving speed and the moving direction of the parcel. Accordingly, instruction projecting device 30 can precisely obtain the projection position of the parcel to which the projection image is to be correctly projected.

The image may be the distance image including the distance information in which each of the pixels indicates a distance from the imaging position. Accordingly, instruction projecting device 30 can precisely obtain the projection position of the parcel to which the projection image is to be correctly projected.

Parcel sorting system 100 of the present embodiment includes instruction projecting device 30 described above, label reader 10 which read the parcel identification information from the label attached to the parcel, image sensor 20 which obtains the image, and projector 40 which projects the projection image on the parcel. Accordingly, it is possible to more precisely project the projection image on the parcel along the movement of the parcel and the projection of the image is seen to be smooth even if eyes of the human see the image.

The instruction projecting method of the present embodiment is a method of generating the projection image to be projected on the parcel based on an image including the parcel and parcel identification information specifying the parcel in the image. By cooperating with memory 36, processor 34 obtains the first time information corresponding to a time of obtaining the image, generates the projection image to be projected on the parcel, obtains the second time information corresponding to a time of generating the projection image, and calculates the position on which the projection image is projected based on the difference between the first time information and the second time information.

Accordingly, instruction projecting device 30 can obtain the projection position of the parcel to which the projection image is to be correctly projected. As a result, projector 40 can more precisely project the projection image on the parcel along the movement of the parcel and the projection of the image is seen to be smooth even if eyes of the human see the image.

As described above, instruction projecting device 30 of the present embodiment which generates the projection image to be projected on the parcel based on the image including the parcel and the parcel identification information specifying the parcel in the image, instruction projecting device 30 including processor 34 and memory 36. By cooperating with memory 36, processor 34 determines whether or not the parcel is picked up based on the parcel image in the image, and in a case where it is determined that the parcel is picked up, the processor generates the projection image including the detail information of the parcel.

Accordingly, it is possible for the worker to recognize more detailed attributes related to the parcel as well as whether or not to pick up the parcel with reference to the detail information and it is possible to improve efficiency of the sorting of the parcel and the loading of the parcel.

The detail information may be information including a location at which the parcel is to be disposed corresponding to the parcel identification information. Accordingly, the worker can smoothly dispose the parcel at the appropriate position and it is possible to improve the efficiency of the sorting of the parcel and the loading of the parcel.

The detail information may be information including the location at which the parcel is to be disposed in the vicinity of the worker who picks up the parcel. Accordingly, the worker can smoothly dispose the parcel at the appropriate position and it is possible to improve the efficiency of the sorting of the parcel and the loading of the parcel.

The position may include information of the specific position in the truck bed in which the parcel is loaded. Accordingly, the worker can smoothly dispose the parcel at the appropriate position and it is possible to improve the efficiency of the sorting of the parcel and the loading of the parcel.

The image may be the distance image including the distance information in which each of the pixels indicates a distance from the imaging position.

Accordingly, instruction projecting device 30 can precisely obtain the projection position of the parcel to which the projection image is to be correctly projected.

Parcel sorting system 100 of the present embodiment includes instruction projecting device 30 described above, label reader 10 which reads the parcel identification information from the label attached to the parcel, image sensor 20 which obtains the image, and projector 40 which projects the projection image on the parcel. Accordingly, it is possible for the worker to recognize more detailed attributes related to the parcel as well as whether or not to pick up the parcel with reference to the detail information and it is possible to improve the efficiency of the sorting of the parcel and the loading of the parcel.

The instruction projecting method of the present embodiment is a method of generating the projection image to be projected on the parcel based on the image including the parcel and the parcel identification information specifying the parcel in the image. By cooperating with the memory, the processor determines whether or not the parcel is picked up based on the parcel image in the image, and in a case where it is determined that the parcel is picked up, the processor generates the projection image including the detail information of the parcel.

Accordingly, it is possible for the worker to recognize more detailed attributes related to the parcel as well as whether or not to pick up the parcel with reference to the detail information and it is possible to improve the efficiency of the sorting of the parcel and the loading of the parcel.

As described above, instruction projecting device 30 of the present embodiment which specifies the position of the parcel based on the image including the parcel and the parcel identification information specifying the parcel in the image, instruction projecting device 30 including processor 34 and memory 36. By cooperating with memory 36, processor 34 determines whether or not each of pixels in the image is a pixel included in processing target space S in which the parcel is to be present based on coordinates of each of the pixels, regards only the pixel included in processing target space S as a processing point to be processed and registers the processing point in memory 36, and obtains the image of the parcel based on the registered processing point to specify the position of the parcel.

Accordingly, processor 34 decreases the processing targets by limiting processing target space S to be processed and it is possible to effectively and precisely sort the parcel as a result.

Processing target space S may be a space partitioned by a range from the transport conveyor transporting the parcel in the image to a predetermined height. Accordingly, by further limiting processing target space S to be processed by processor 34, it is possible to further decrease the processing targets.

Processing target space S may be a space partitioned by a range of a predetermined length of the transport conveyor in the image in the transport direction. Accordingly, by further limiting processing target space S to be processed by processor 34, it is possible to further decrease the processing targets.

Processing target space S may be a space partitioned by a range of a predetermined width of the transport conveyor in the image in the transport direction. Accordingly, by further limiting processing target space S to be processed by processor 34, it is possible to further decrease the processing targets.

As described above, it is preferable that processing target space S is a space partitioned based on the transport conveyor in the image.

The image may be the distance image including the distance information in which each of the pixels indicates a distance from the imaging position. Accordingly, instruction projecting device 30 can precisely obtain the projection position of the parcel to which the projection image is to be correctly projected.

Processor 34 generates the projection image to be projected on the parcel. Accordingly, it is possible to effectively and precisely sort the parcel as a result.

Parcel sorting system 100 of the present embodiment includes instruction projecting device 30 described above, label reader 10 which reads the parcel identification information from the label attached to the parcel, image sensor 20 which obtains the image, and projector 40 which projects the projection image on the parcel. Accordingly, processor 34 decreases the processing targets by limiting the processing target space to be processed and it is possible to effectively and precisely sort the parcel as a result.

The instruction projecting method of the present embodiment is the instruction projecting device which specifies the position of the parcel based on the image including the parcel and the parcel identification information specifying the parcel in the image. By cooperating with memory 36, processor 34 determines whether or not each of pixels in the image is a pixel included in the processing target space in which the parcel is to be present based on coordinates of each of the pixels, regards only the pixel included in the processing target space as a processing point to be processed and registers the processing point in memory 36, and obtains the image of the parcel based on the registered processing point to specify the position of the parcel.

Accordingly, processor 34 decreases the processing targets by limiting the processing target space to be processed and it is possible to effectively and precisely sort the parcel as a result.

As described above, instruction projecting device 30 of the present embodiment which generates the projection image to be projected on the parcel based on the image including the parcel and the parcel identification information specifying the parcel in the image, instruction projecting device 30 including processor 34 and memory 36. By cooperating with memory 36, processor 34 specifies the parcel image from the image including the parcel, extracts the specific surface of the parcel, and generates the projection image to be projected on the specific surface.

Accordingly, by extracting the projected surface on which the projection image is to be projected, processor 34 does not need to perform the process, on the distance image displaying the whole parcel and the processing load is reduced.

In a case where the parcel has an approximately rectangular parallelepiped shape, the specific surface may be the upper surface of the parcel. Accordingly, the projection image becomes easy for the worker to see.

In a case where the parcel has an approximately rectangular parallelepiped shape, the specific surface may be one side surface of the parcel. Accordingly, the projection image becomes easy for the worker to see.

The image may be the distance image including the distance information in which each of the pixels indicates a distance from the imaging position. Accordingly, instruction projecting device 30 can precisely obtain the projection position of the parcel to which the projection image is to be correctly projected.

Parcel sorting system 100 of the present embodiment includes instruction projecting device 30 described above, label reader 10 which reads the parcel identification information from the label attached to the parcel, image sensor 20 which obtains the image, and projector 40 which projects the projection image on the parcel. Accordingly, by extracting the projected surface on which the projection image is to be projected, processor 34 does not need to perform the process, on the distance image displaying the whole parcel and the processing load is reduced.

The instruction projecting method of the present embodiment is a method of generating the projection image to be projected on the parcel based on the image including the parcel and the parcel identification information specifying the parcel in the image. By cooperating with memory 36, processor 34 extracts the parcel image from the image including the parcel, specifies the specific surface of the parcel, and generates the projection image to be projected on the specific surface based on only the specific surface.

Accordingly, by extracting the projected surface on which the projection image is to be projected, processor 34 does not need to perform the process, on the distance image displaying the whole parcel and the processing load is reduced.

As described above, instruction projecting device 30 of the present embodiment which generates the projection image to be projected on the parcel based on the image including the parcel and the parcel identification information specifying the parcel in the image, instruction projecting device 30 including processor 34 and memory 36. By cooperating with memory 36, processor 34 determines the direction to pick up the parcel based on the parcel identification information and generates the projection image including the arrow corresponding to the direction to pick up the parcel.

Accordingly, it is possible to generate the projection image for the worker easily identifying the parcel to be picked up by the worker himself and it is possible to suppress a miss of the sorting work and to improve efficiency.

Corresponding to the direction to pick up the parcel, processor 34 may select a template image of an arrow prepared in advance and may generate the projection image including the arrow. Accordingly, it is possible to easily generate the arrow.

Corresponding to the direction to pick up the parcel, processor 34 may rotate a rotatable arrow image prepared in advance and may generate the projection image including the arrow. Accordingly, it is possible to easily generate the arrow.

Processor 34 changes size of the arrow according to size of the surface on which the projection image is projected. Accordingly, it is possible to generate the arrow having the appropriate size.

The image may be the distance information in which each of the pixels indicates a distance from the imaging position. Accordingly, instruction projecting device 30 can precisely obtain the projection position of the parcel to which the projection image is to be correctly projected.

Parcel sorting system 100 of the present embodiment includes instruction projecting device 30 described above, label reader 10 which reads the parcel identification information from the label attached to the parcel, image sensor 20 which obtains the image, and projector 40 which projects the projection image on the parcel. Accordingly, it is possible to generate the projection image for the worker easily identifying the parcel to be picked up by the worker himself and it is possible to suppress a miss of the sorting work and to improve the efficiency.

The instruction projecting method of the present embodiment is a method of generating the projection image to be projected on the parcel based on the image including the parcel and the parcel identification information specifying the parcel in the image. By cooperating with memory 36, processor 34 determines the direction to pick up the parcel based on the parcel identification information and generates the projection image including the arrow corresponding to the direction to pick up the parcel.

Accordingly, by extracting the projected surface on which the projection image is to be projected, processor 34 does not need to perform the process, on the distance image displaying the whole parcel and the processing load is reduced.

As described above, instruction projecting device 30 of the present embodiment which generates the projection image to be projected on the parcel based on the image including the parcel and the parcel identification information specifying the parcel in the image, instruction projecting device 30 including processor 34 and memory 36. By cooperating with memory 35, processor 34 determines the specific area in which the parcel is picked up in a specific direction based on the parcel identification information and generates projection condition information on which the projection image is projected in only a case where the parcel exists in the specific area.

Accordingly, by performing the projection on only the parcel which each of the workers has to pick up, it becomes easy for the worker himself to specify the parcel to be picked up. In addition, it is possible to minimize the number of the patterns of the projection image.

The specific area may be an area partitioned by a specific length of the transport conveyor in the transport direction. Accordingly, by performing the projection on only the parcel which each of the workers has to pick up, it becomes easy for the worker himself to specify the parcel to be picked up.

The image may be the distance image including the distance information in which each of the pixels indicates a distance from the imaging position. Accordingly, instruction projecting device 30 can precisely obtain the projection position of the parcel to which the projection image is to be correctly projected.

Parcel sorting system 100 of the present embodiment includes instruction projecting device 30 described above, label reader 10 which read the parcel identification information from the label attached to the parcel, image sensor 20 which obtains the image, and projector 40 which projects the projection image on the parcel. Accordingly, by performing the projection on only the parcel which each of the workers has to pick up, it becomes easy for the worker himself to specify the parcel to be picked up.

The instruction projecting method of the present embodiment is a method of generating the projection image to be projected on the parcel based on the image including the parcel and the parcel identification information specifying the parcel in the image. By cooperating with memory 36, processor 34 determines the specific area in which the parcel is picked up in a specific direction based on the parcel identification information and generates projection condition information on which the projection image is projected in only a case where the parcel exists in the specific area.

Accordingly, by performing the projection on only the parcel which each of the workers has to pick up, it becomes easy for the worker himself to specify the parcel to be picked up. In addition, it is possible to minimize the number of the patterns of the projection image.

Although the embodiment of the parcel sorting system according to the present disclosure is described with reference to the drawings, the present disclosure is not limited to such an example. Those skilled in the art can conceive various modification examples, change examples, substitution examples, addition examples, deletion examples, and equivalent examples within the scope described in the claims and these rightly belong to the technical scope of the present disclosure.

INDUSTRIAL APPLICABILITY

The present disclosure is related to an instruction projecting device, a parcel sorting system, and an instruction projecting method useful for parcel sorting capable of more effectively and precisely sorting a parcel.

REFERENCE MARKS IN THE DRAWINGS

10 LABEL READER
20 DISTANCE IMAGE SENSOR (IMAGE SENSOR)
30 INSTRUCTION PROJECTING DEVICE
32 INPUT UNIT
34 PROCESSOR
36 MEMORY
38 OUTPUT UNIT
40 PROJECTOR
50 TRANSPORT CONVEYOR
60 IMAGING PROJECTION DEVICE
100 PARCEL SORTING SYSTEM
P PARCEL

The invention claimed is:
1. A projection instruction device comprising:
a processor; and
a memory,
wherein, by cooperating with the memory,
the processor determines a specific area, in which a parcel is to be picked up, based on parcel identification information specifying the parcel, of a plurality of partitioned areas included in a projection area, and in a case where the parcel is present in the specific area, the processor instructs to project a projection image on the parcel, and in a case where the parcel is present in a partitioned area other than the specific area, the processor instructs not to project the projection image on the parcel, the partitioned area being one of the plurality of partitioned areas in the projection area.

2. The projection instruction device of claim 1, wherein the plurality of partitioned areas are obtained by partitioning the projection area on a transport conveyor in a transport direction.

3. The projection instruction device of claim 1, wherein, each of the plurality of partitioned areas is assigned to a destination of the parcel.

4. The projection instruction device of claim 1, wherein, each of the plurality of partitioned areas is assigned to a worker who is to pick up the parcel.

5. The projection instruction device of claim 1, wherein, each of the plurality of partitioned areas is assigned to a truck which is to transport the parcel.

6. The projection instruction device according to claim 1, wherein, by cooperating with the memory, the processor further determines a position of the parcel based on an image obtained by an image sensor, the image including the parcel and the parcel identification information, and determines whether or not the parcel is present in the specific area, based on the position of the parcel determined based on the image.

7. The projection instruction device of claim 6, wherein the image is a distance image obtained by a distance image sensor, the distance image including pixels, each of which indicates a distance from a position of the distance image sensor to a position indicated by a corresponding pixel of the pixels.

8. The projection instruction device according to claim 1, wherein the plurality of partitioned areas includes a first partitioned area in which a first parcel is to be picked up, and a second partitioned area in which a second parcel is to be picked up, before the processor instructs to project the projection image on the second parcel being present in the second partitioned area, the second parcel was present in the first partitioned area, and the processor instructs not to project the projection image on the second parcel being present in the first partitioned area.

9. A projection instruction device comprising:
a processor; and
a memory,
wherein, by cooperating with the memory,
the processor determines a specific area, in which a parcel is to be picked up, based on parcel identification information specifying the parcel, of a plurality of partitioned areas included in a projection area, and
in a case where the parcel is present in the specific area, the processor instructs to project a first projection image to the parcel, and
in a case where the parcel is present in a partitioned area other than the specific area, the processor instructs to project a second projection image, distinct from the first projection image projected in a case where the parcel is present in the specific area, the partitioned area being one of the plurality of partitioned areas in the projection area.

10. The projection instruction device of claim 9, wherein, each of the plurality of partitioned areas is assigned to a destination of the parcel.

11. The projection instruction device of claim 9, wherein, each of the plurality of partitioned areas is assigned to a worker who is to pick up the parcel.

12. The projection instruction device of claim 9, wherein, each of the plurality of partitioned areas is assigned to a truck which is to transport the parcel.

13. A parcel sorting system comprising:
a projection instruction device;
a label reader which reads parcel identification information from a label attached to a parcel, parcel identification information specifying the parcel;
an image sensor which obtains an image; and
an image output device which projects a projection image on the parcel,
wherein the projection instruction device comprises:
a processor; and
a memory,
wherein, by cooperating with the memory,
the processor determines a specific area, in which the parcel is to be picked up, based on the parcel identification information, of a plurality of partitioned areas included in a projection area, and
in a case where the parcel is present in the specific area, the processor instructs the image output device to project the projection image on the parcel, and
in a case where the parcel is present in a partitioned area other than the specific area, the processor instructs the image output device not to project the projection image on the parcel, the partitioned area being one of the plurality of partitioned areas in the projection area.

14. A projection instruction method comprising:
by causing a processor to cooperate with a memory,
determining a specific area, in which a parcel is to be picked up, based on parcel identification information specifying the parcel, of a plurality of partitioned areas included in a projection area; and
in a case where the parcel is present in the specific area, instructing to project a projection image on the parcel, and
in a case where the parcel is in a partitioned area other than the specific area, instructing not to project the projection image on the parcel, the partitioned area being one of the plurality of partitioned areas in the projection area.

15. A projection instruction method comprising:
by causing a processor to cooperate with a memory,
determining a specific area, in which a parcel is to be picked up, based on parcel identification information specifying the parcel, of a plurality of partitioned areas included in a projection area; and
in a case where the parcel is present in the specific area, instructing to project a projection image on the parcel, and
in a case where the parcel is present in a partitioned area other than the specific area, instructing to project a second projection image, distinct from the first projection image projected in a case where the parcel is present in the specific area, the partitioned area being one of the plurality of partitioned areas in the projection area.

* * * * *